(12) United States Patent
Sunaga et al.

(10) Patent No.: US 12,162,004 B2
(45) Date of Patent: Dec. 10, 2024

(54) LIQUID HANDLING MICRO-DEVICE AND LIQUID HANDLING SYSTEM INCLUDING THE SAME

(71) Applicant: Enplas Corporation, Saitama (JP)

(72) Inventors: Nobuya Sunaga, Saitama (JP); Seiichiro Suzuki, Saitama (JP); Koichi Ono, Saitama (JP)

(73) Assignee: Enplas Corporation, Saitama (JP)

( * ) Notice: Subject to any disclaimer, the term of this patent is extended or adjusted under 35 U.S.C. 154(b) by 80 days.

(21) Appl. No.: 17/744,689

(22) Filed: May 15, 2022

(65) Prior Publication Data

US 2022/0371004 A1 Nov. 24, 2022

(30) Foreign Application Priority Data

May 20, 2021 (JP) .................................. 2021-085316

(51) Int. Cl.
*B01L 3/00* (2006.01)
*F16K 7/17* (2006.01)

(52) U.S. Cl.
CPC ................ *B01L 3/502* (2013.01); *F16K 7/17* (2013.01); *B01L 2300/0877* (2013.01); *B01L 2400/0481* (2013.01); *B01L 2400/0638* (2013.01); *B01L 2400/065* (2013.01)

(58) Field of Classification Search
CPC ............ B01L 3/502; B01L 2400/0638; B01L 2400/0644; B01L 2400/065; B01L 2400/0481; B01L 2300/0877; F16K 99/0013; F16K 99/0011; F16K 7/17
See application file for complete search history.

(56) References Cited

U.S. PATENT DOCUMENTS

| | | | |
|---|---|---|---|
| 6,167,910 B1 * | 1/2001 | Chow ................. | B81C 1/00119 137/526 |
| 6,293,012 B1 * | 9/2001 | Moles ................. | F16K 99/0015 29/890.132 |
| 6,540,895 B1 * | 4/2003 | Spence ............. | B01L 3/502761 204/600 |
| 6,885,982 B2 * | 4/2005 | Harris ............... | B01L 3/502707 707/999.102 |
| 7,998,437 B2 * | 8/2011 | Berndt ............. | B01L 3/502715 422/538 |

(Continued)

FOREIGN PATENT DOCUMENTS

JP 2011-202681 10/2011

*Primary Examiner* — Daphne M Barry

(57) ABSTRACT

The present invention aims to provide a fluid handling device which can be manufactured more conveniently, can easily open and close a channel, and can be miniaturized. The fluid handling device of the present invention includes: a first channel; a second channel; and a valve disposed between the first channel and the second channel, in which the valve includes: a groove-shaped valve seat disposed in a board, and a flat plate-shaped flexible layer covering the groove-shaped valve seat, and the valve communicates between the first channel and the second channel when the flat plate-shaped flexible layer and a bottom of the groove-shaped valve seat are spaced apart from each other, and blocks communication between the first channel and the second channel when the flat plate-shaped flexible layer and an inner wall of the groove-shaped valve seat are in contact with each other.

7 Claims, 12 Drawing Sheets

(56) References Cited

U.S. PATENT DOCUMENTS

| | | | | |
|---|---|---|---|---|
| 9,211,539 | B2* | 12/2015 | Amin | B01F 33/30 |
| 10,830,362 | B2* | 11/2020 | Ono | B01L 3/502738 |
| 2003/0098076 | A1* | 5/2003 | Nichols | F16K 11/074 |
| | | | | 137/625.46 |
| 2008/0153078 | A1* | 6/2008 | Braman | B01L 3/502 |
| | | | | 435/306.1 |
| 2011/0233443 | A1 | 9/2011 | Kamada et al. | |
| 2012/0309648 | A1* | 12/2012 | Tseng | C07D 213/74 |
| | | | | 506/11 |
| 2013/0203634 | A1* | 8/2013 | Jovanovich | F16K 99/0015 |
| | | | | 506/26 |
| 2015/0308578 | A1* | 10/2015 | Block, III | C12M 21/08 |
| | | | | 137/625.48 |
| 2016/0375438 | A1* | 12/2016 | Marcy | B01L 3/502715 |
| | | | | 506/39 |
| 2017/0144155 | A1* | 5/2017 | Bohm | B01L 3/502738 |
| 2018/0078937 | A1* | 3/2018 | Rensch | B01L 3/502715 |
| 2018/0326424 | A1* | 11/2018 | Ririe | C12Q 1/686 |
| 2021/0197194 | A1* | 7/2021 | Schaffer | B01L 3/527 |
| 2021/0283602 | A1* | 9/2021 | Sunaga | B01L 3/502715 |
| 2021/0283603 | A1* | 9/2021 | Sunaga | B01L 3/50273 |
| 2021/0283604 | A1* | 9/2021 | Yamauchi | B01L 3/502738 |
| 2022/0097053 | A1* | 3/2022 | Sunaga | B01L 3/502769 |

\* cited by examiner

LIQUID HANDLING MICRO-DEVICE AND LIQUID HANDLING SYSTEM INCLUDING THE SAME

CROSS REFERENCE TO RELATED APPLICATIONS

This application is entitled to and claims the benefit of Japanese Patent Application No. 2021-085316, filed on May 20, 2021, the disclosure of which including the specification, drawings and abstract is incorporated herein by reference in its entirety.

Technical Field

The present invention relates to a fluid handling device and a fluid handling system including the same.

Background Art

In recent years, a fluid handling device has been used in order to conduct an analysis of a trace amount of substance such as a protein or a nucleic acid with high accuracy and at high speed. Advantageously, the fluid handling device requires only a small amount of reagents and samples for the analysis, and are expected to be used in various applications such as clinical tests, food tests, and environmental tests. A plurality of channels are usually arranged in the fluid handling device, and it is required to selectively flow a desired reagent, a sample, or the like in a desired channel. To this end, it is common that an openable/closable valve is disposed between a plurality of channels.

Here, a diaphragm valve is known as the valve disposed between a plurality of channels (see, e.g., Patent Literature (hereinafter, referred to as "PTL") 1 or the like). The conventional diaphragm valve has, for example, a partition wall (valve seat) disposed between two channels, and a dome-shaped diaphragm portion (valve body) disposed to cover the partition wall and to be spaced apart from the partition wall. In an open state of the diaphragm valve, a fluid can flow between the diaphragm portion and the partition wall. On the other hand, in a closed state of the diaphragm, the diaphragm portion is pressed against the partition wall, the fluid is intercepted by the partition wall.

CITATION LIST

Patent Literature

PTL 1
Japanese Patent Application Laid-Open No. 2011-202681

SUMMARY OF INVENTION

Technical Problem

However, in the diaphragm valve as described in PTL 1, the diaphragm portion (valve body) has to be formed into a dome shape. Further, since the diaphragm portion is deformed when heat is applied to the diaphragm portion, bonding at a high temperature between a member on which the diaphragm portion is formed and other members is difficult. Further, since the diaphragm portion protrudes to the outside of the fluid handling device, the device is likely to be enlarged.

An object of the present invention is to provide a fluid handling device and a fluid handling system using the same, which can be more easily manufactured, can easily open and close a channel, and can be miniaturized.

Solution to Problem

The present invention provides the following fluid handling device:

a fluid handling device, including: a first channel; a second channel; and a valve disposed between the first channel and the second channel, in which the valve includes: a groove-shaped valve seat disposed in a board, and a flat plate-shaped flexible layer covering the groove-shaped valve seat, and the valve communicates between the first channel and the second channel when the flat plate-shaped flexible layer and an inner wall of the groove-shaped valve seat are spaced apart from each other, and blocks communication between the first channel and the second channel when the flat plate-shaped flexible layer and the inner wall of the groove-shaped valve seat are in contact with each other.

The present invention provides the following fluid handling system:

a fluid handling system, including: the above-described fluid handling device; and a valve sliding member capable of pressing the flat plate-shaped flexible layer of the valve.

Advantageous Effects of Invention

The fluid handling device of the present invention can be easily manufactured and can be miniaturized. Further, according to the fluid handling device, it is easy to open and close the channel by the valve.

DESCRIPTION OF EMBODIMENTS

Figure 1:
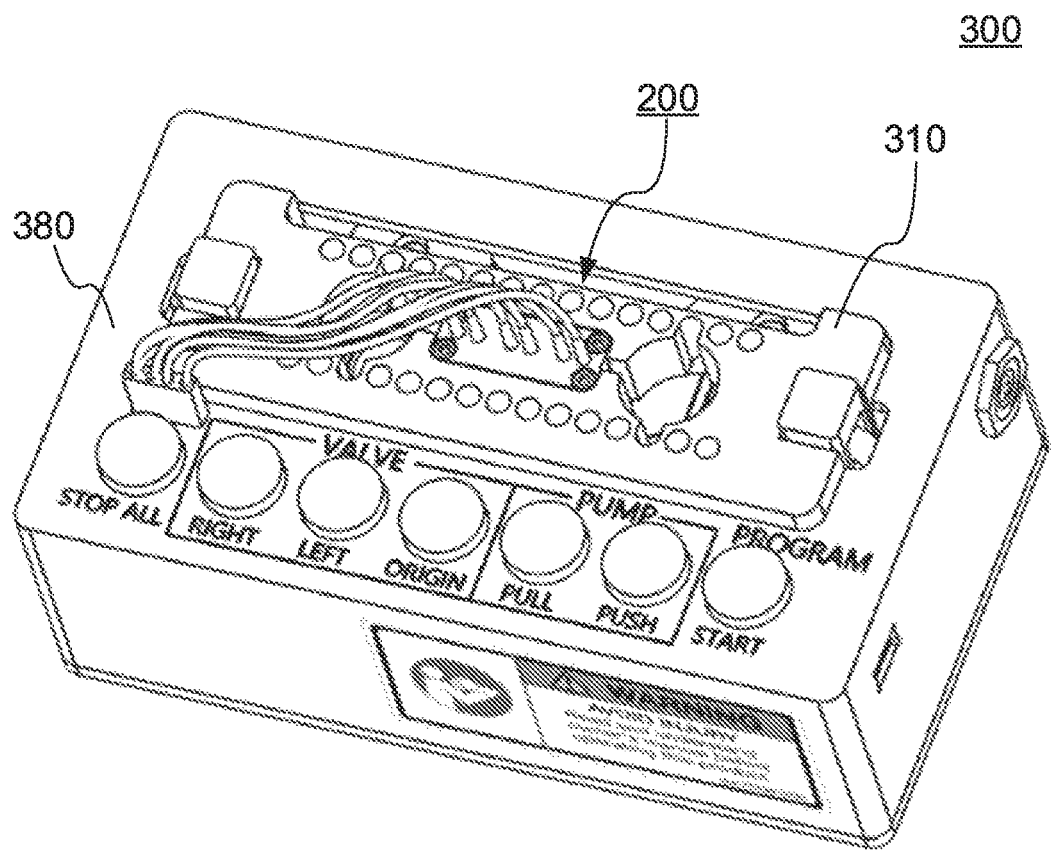
FIG. 1 is a perspective view of a fluid handling system according to an embodiment.
Figure 2:
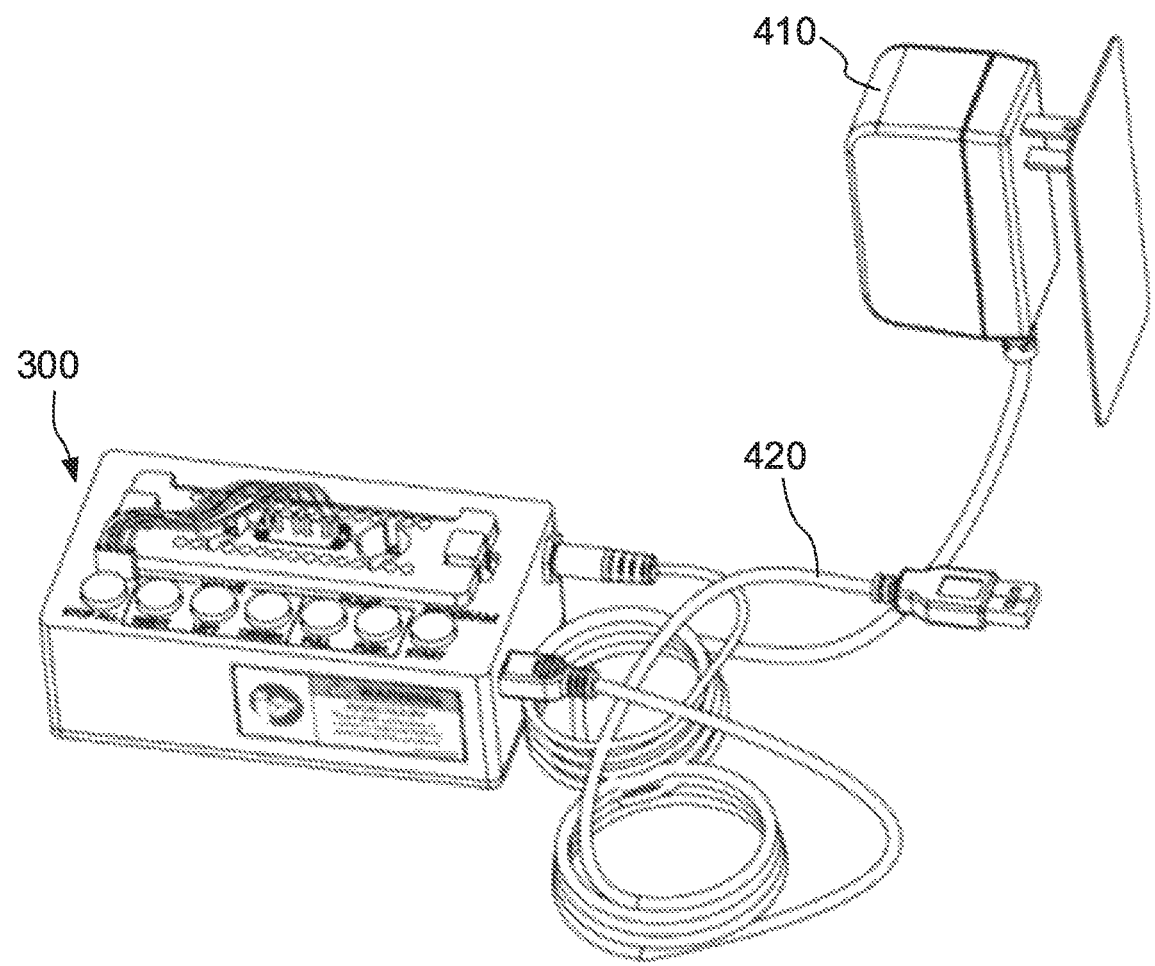
FIG. 2 is a perspective view illustrating an example of a fluid handling system in use.

Hereinafter, a fluid handling device and a fluid handling system according to an embodiment of the present invention will be described. FIG. 1 is a perspective view of fluid handling system 300 according to one embodiment. FIG. 2 is a perspective view of one example of fluid handling system 300 in use. Fluid handling system 300 is an apparatus for controlling fluid flowing through a channel. The type of fluid flowing in fluid handling system 300 is not particularly limited, and various fluids such as a reagent, a liquid sample, a cleaning liquid, a gas, a powder, and the like can be used.

Fluid handling system 300 of the present embodiment is used in a state of being connected to a commercial power source via AC adapter 410 as illustrated in FIG. 2. In case that fluid handling system 300 has an internal power source, fluid handling system 300 can be used even in a state where it is not connected to the commercial power source.

Fluid handling system 300 may be connected via USB cable 420 or the like to an operation setting system (not illustrated) configured to control the operation of fluid handling system 300. In addition, fluid handling system 300 may include: storage 370 for storing a program coded for an operation procedure; and control section 360 for controlling, based on the program stored in storage 370, the operation of valve control section 320 for controlling valves 250 (valve sliding member (meaning a sliding member for valves) 321 and first drive section 324), pump control section 330 for controlling pump 260 (pump sliding member (meaning a sliding member for a pump) 331 and second drive section 334), and/or the like (see FIG. 4). In this case, fluid handling system 300 can operate independently even when not connected to the operation setting system. On the other hand, when fluid handling system 300 does not include storage 370 and control section 360, fluid handling system 300 operates in accordance with an instruction from the operation setting system (not illustrated) connected via USB cable 420 or the like.

Figure 4:
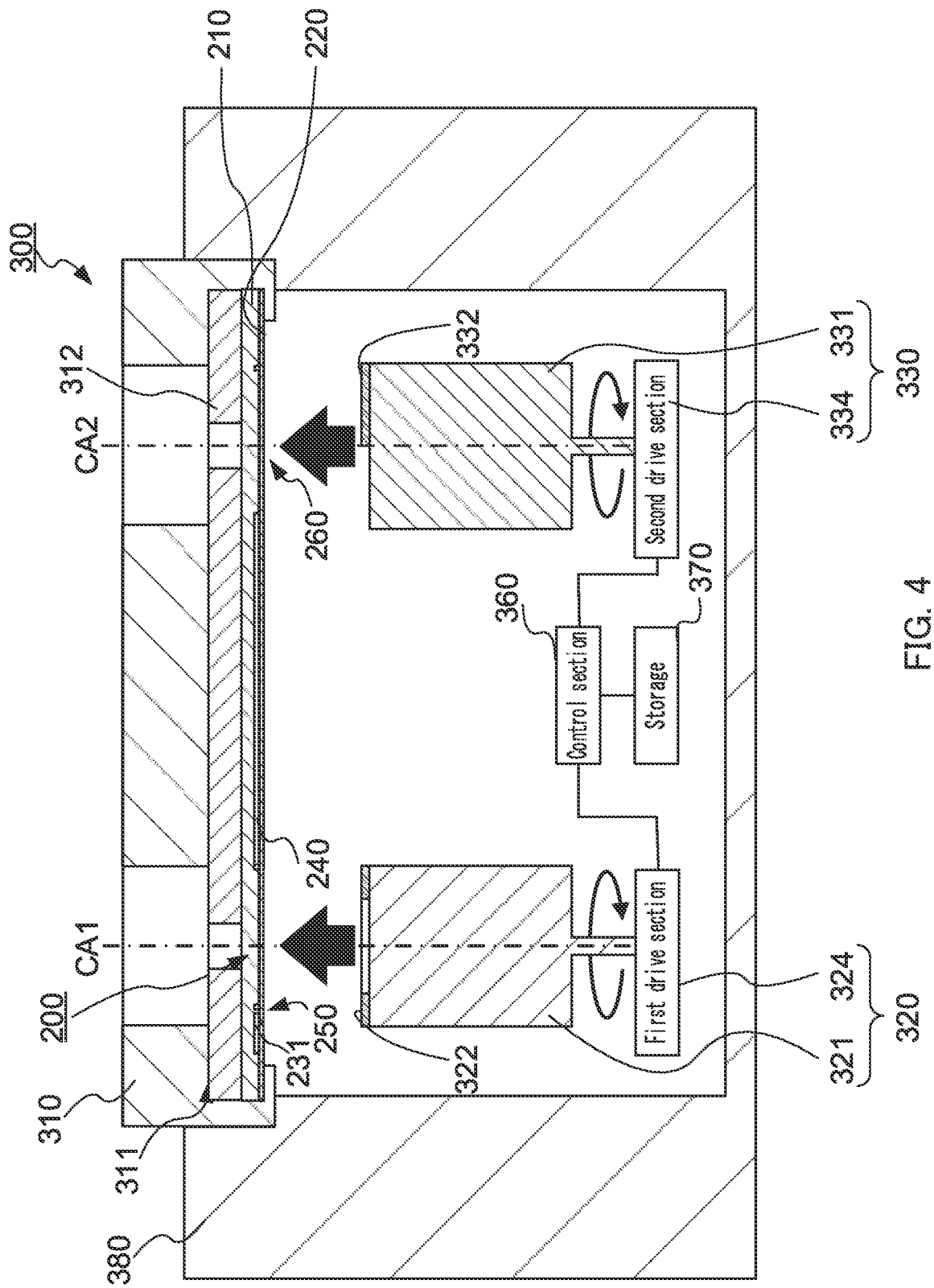
FIG. 4 is a schematic sectional view illustrating the configuration of the fluid handling system.

As illustrated in FIG. 4, fluid handling system 300 is used in a state of accommodating fluid handling device 200 including channels 231 and 240, wells 230, valves 250, pump 260, and the like. In addition, fluid handling device 200 is configured to be detachable. In FIG. 4, a part of the configuration is omitted. Hereinafter, the configurations of fluid handling device 200 and fluid handling system 300 will be described in detail.

Configuration of Fluid Handling Device

Figure 3A:
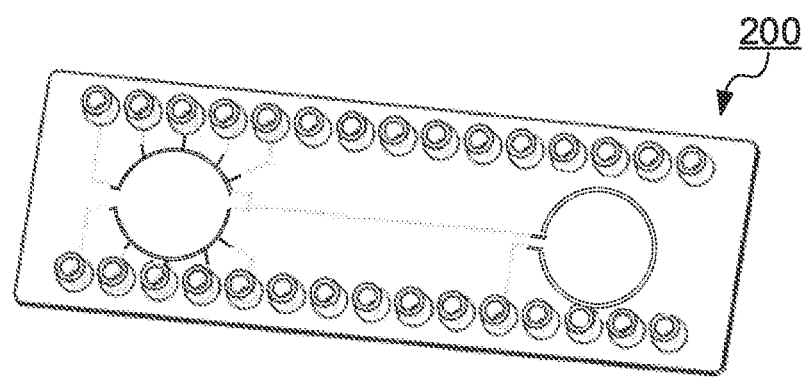
FIG. 3A is a perspective view of the fluid handling device.
Figure 3B:
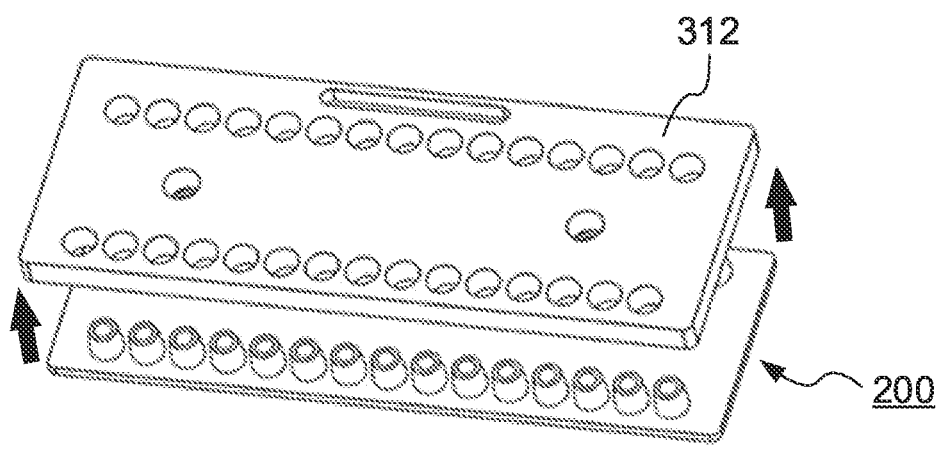
FIG. 3B is a perspective view illustrating a state in which the fluid handling device and a spacer are stacked on each other.
Figure 3C:
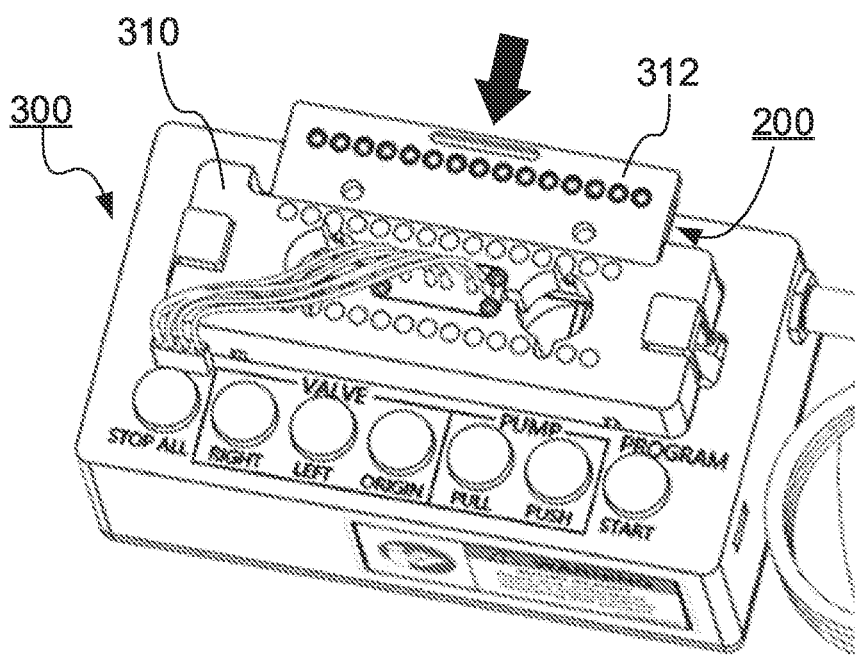
FIG. 3C is a perspective view illustrating a state in which a laminate of the fluid handling device and the spacer is housed in a chip holder of the fluid handling system.

FIG. 3A is a perspective view of fluid handling device 200 of the present embodiment. Fluid handling device 200 includes board 210 and flexible layer 220. In the present embodiment, fluid handling device 200 is made of a transparent material, and in FIG. 3A, the inner structure and the backside structure of fluid handling device 200 are also indicated by broken lines. Fluid handling device 200 is housed within chip holder 310 of fluid handling system 300 as illustrated in FIG. 3C or FIG. 4 while being stacked on spacer 312 as illustrated in FIG. 3B. Through holes that can accommodate wells 230 are formed in spacer 312 at positions corresponding to a plurality of wells 230 in fluid handling device 200.

Fluid handling device 200 is fixed so that flexible layer 220 is pressed by valve control section 320 (valve sliding member 321) and pump control section 330 (pump sliding member 331) of fluid handling system 300 within chip holder 310 of fluid handling system 300 to be described later. In FIG. 4, for clarity of the configuration of fluid handling system 300, fluid handling device 200 spaced from valve sliding member 321 and pump sliding member 331 is illustrated.

Figure 5:
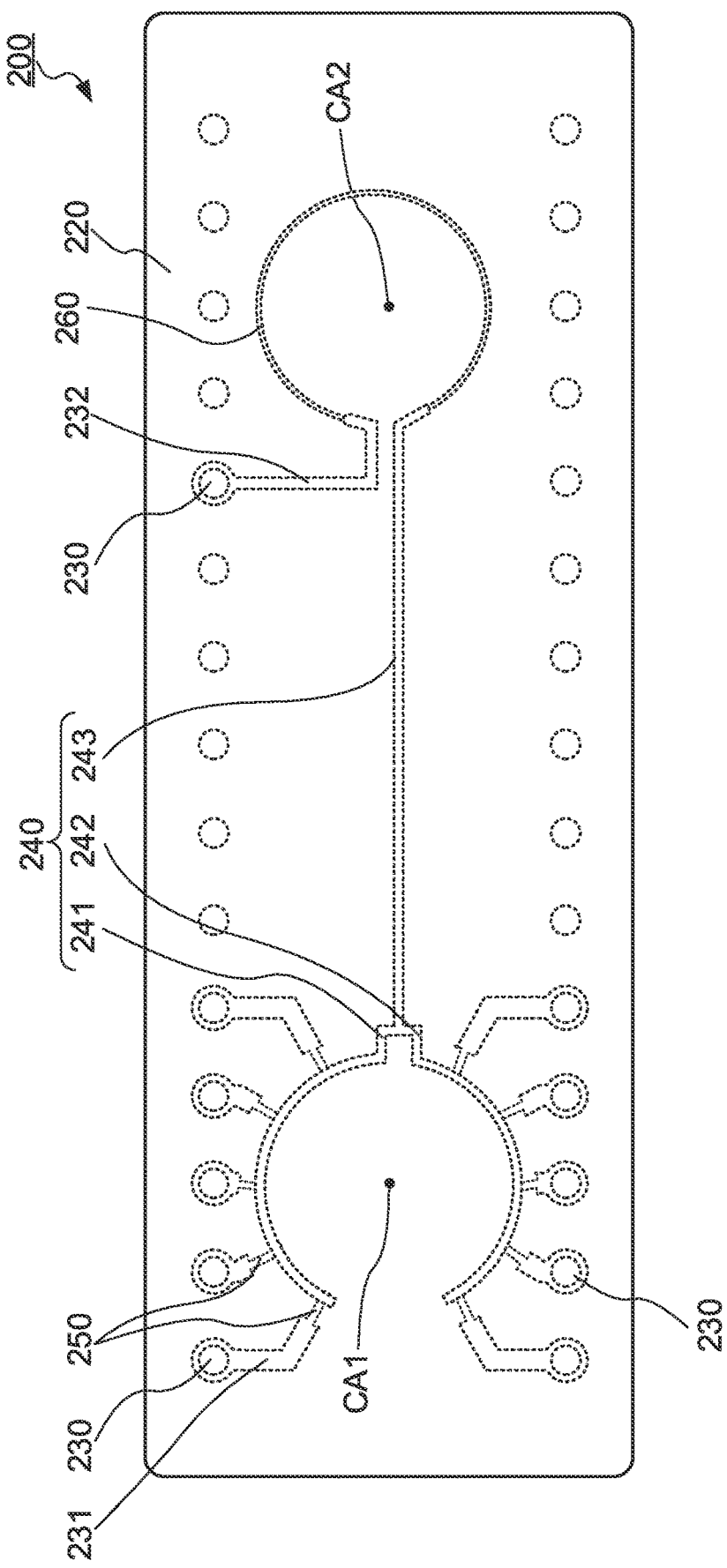
FIG. 5 is a bottom view of the fluid handling device according to the embodiment.
Figure 6A:
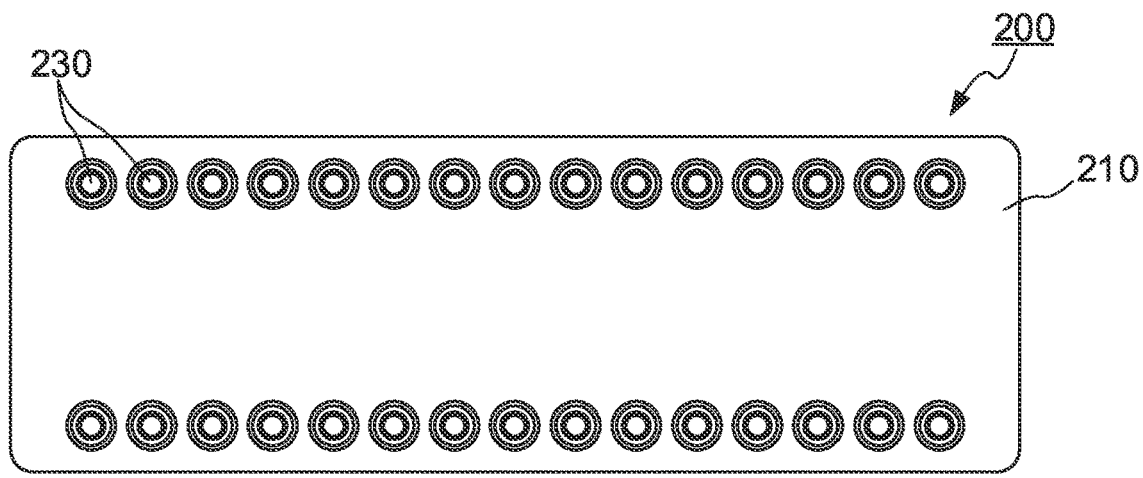
FIG. 6A is a plan view of the fluid handling device according to the embodiment.
Figure 6B:
FIG. 6B is a bottom view of the fluid handling device.
Figure 6C:
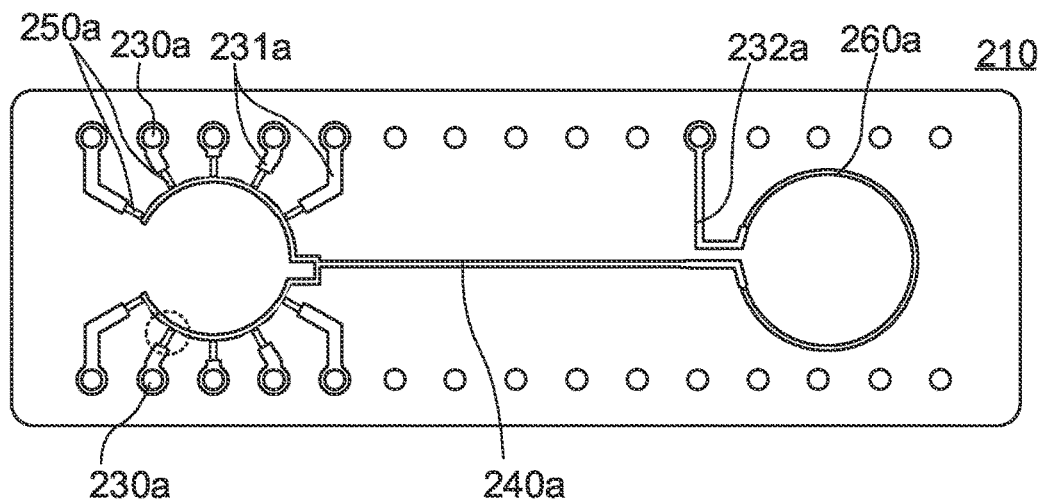
FIG. 6C is a bottom view of the board of the fluid handling device.

FIG. 5 is a bottom view of fluid handling device 200 according to the present embodiment. In FIG. 5, the internal structure of fluid handling device 200 is also illustrated by broken lines. FIG. 6A is a plan view of fluid handling device 200. FIG. 6B is a bottom view of fluid handling device 200. FIG. 6C is a bottom view of board 210 (a bottom view of board 210 from which flexible layer 220 is removed).

As illustrated in FIG. 5, fluid handling device 200 includes a plurality of wells 230, a plurality of first channels 231 respectively connected to wells 230, second channel 240, a plurality of valves 250 respectively disposed between first channels 231 and second channel 240, and pump 260 connected to second channel 240. Fluid handling device 200 according to the present embodiment further includes vent channel 232 connecting pump 260 and well 230 functioning as a vent hole.

Here, as illustrated in FIG. 6C, board 210 of fluid handling device 200 includes grooves (hereinafter, also referred to as "first grooves") 231a partly forming first channels 231, groove (hereinafter, also referred to as "second groove") 240a partly forming second channel 240, groove (hereinafter, also referred to as "vent groove") 232a partly forming vent channel 232, grooves (hereinafter, also referred to as "groove-like valve seats") 250a for valves, groove (hereinafter, also referred to as "pump groove") 260a for the pump, and through holes 230a for serving as fluid inlets or outlets (wells 230) and/or a through hole 230a for serving as the vent hole (well 230). The surface including first grooves 231a, second groove 240a, and the like is the back surface of board 210, that is, the surface to be bonded to flexible layer 220.

The material contained in board 210 may be appropriately selected from, for example, known resins and glasses. Examples of materials included in board 210 include polyethylene terephthalate, polycarbonate, polymethyl methacrylate, polyvinyl chloride, polypropylene, polyether, polyethylene, polystyrene, cycloolefin-based resins, silicone resins and elastomers. The size and thickness of board 210 are appropriately selected in accordance with the application of fluid handling device 200, the depth and width of the grooves in board 210, and the like. The thickness of board 210 is, for example, 1 mm or greater and 10 mm or less. Also, the material contained in board 210 is not particularly limited.

Figure 7A:
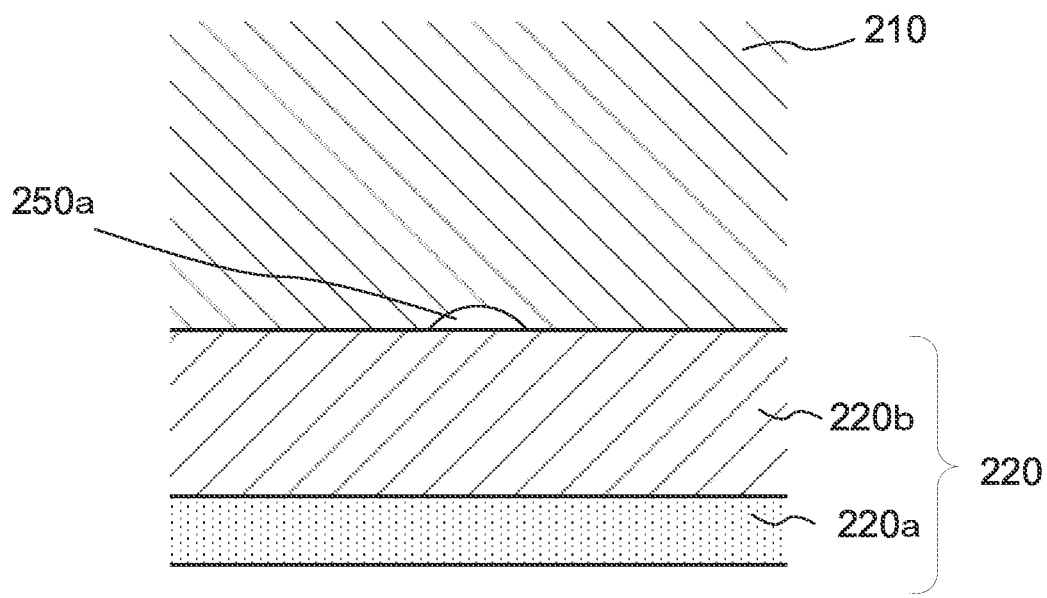
FIGS. 7A and 7B are enlarged views of a cross section perpendicular to the length direction of a groove-shaped valve seat of a valve of the fluid handling device according to the embodiment.
Figure 7B:
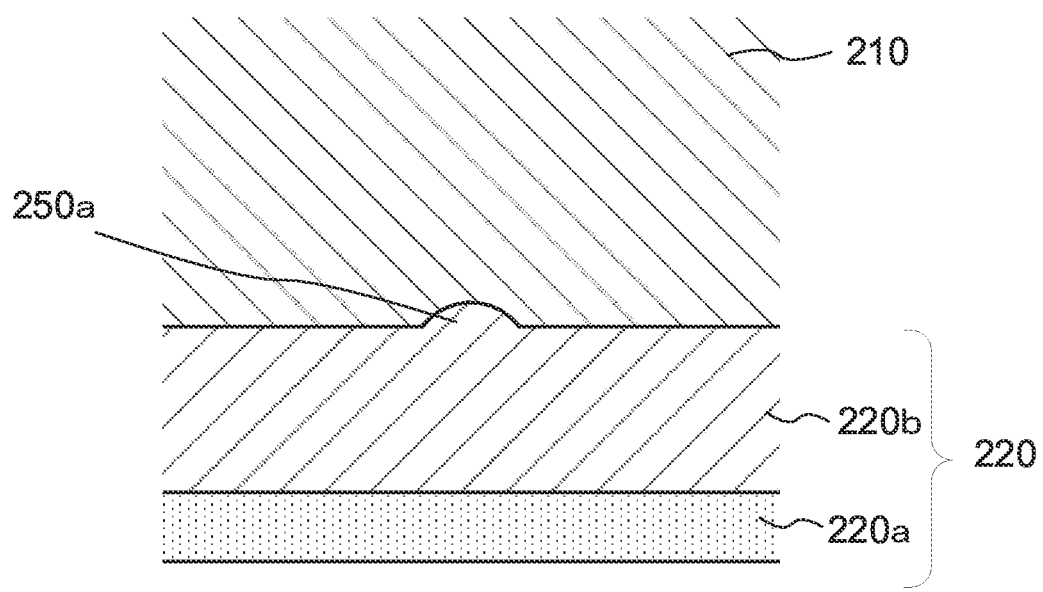

Further, flexible layer 220 is a flat plate-shaped member. Flexible layer 220 is, for example, a film. In the present embodiment, flexible layer 220 functions not only as a member covering the grooves or the through holes in board 210, but also as a valve body of valves 250 and as a part of pump 260. Accordingly, at least a portion of flexible layer 220 is made of a material having elasticity. FIG. 7A and FIG. 7B illustrate enlarged views of a cross section perpendicular to the length of groove-shaped valve seat 250a of one valve 250 according to the present embodiment. FIG. 7A is the open state of valve 250, and FIG. 7B is the closed state of valve 250. As illustrated in FIG. 7A, when not pressed by below-described valve sliding member 321 and/or pump sliding member 331 (not illustrated in FIG. 7A) of fluid handling system 300, flexible layer 220 is disposed to be sufficiently spaced part from the inner walls of groove-shaped valve seat 250*a* and/or pump groove 260*a* (in FIG. 7A groove-shaped valve seat 250*a*). On the other hand, as illustrated in FIG. 7B, flexible layer 220 is deformed when pressed by below-described valve sliding member 321 and/or pump sliding member 331 (not illustrated in FIG. 7B) of fluid handling system 300, and is brought into tight contact with the inner walls of groove-shaped valve seat 250*a* and/or pump groove 260*a* (groove-shaped valve seat 250*a* in FIG. 7B) without any gap being present in between. In this specification, the inner walls of groove-shaped valve seat 250*a* and pump groove 260*a* refer to the side walls and the bottom surfaces of groove-shaped valve seats 250*a* and pump groove 260*a*.

Such a flexible layer 220 may be formed by a single layer or may be composed of a plurality of layers. When flexible layer 220 is composed of a single layer, it is preferable that entire flexible layer 220 be made of a material having elasticity (e.g., an elastomer). Meanwhile, in view of the slidability of valve sliding member 321 and pump sliding member 331, it is preferable that flexible layer 220 be composed of a plurality of layers. Specifically, among the plurality of layers constituting flexible layer 220, layer 220*a* making contact with valve sliding member 321 and pump sliding member 331 is preferably a layer offering good slidability for valve sliding member 321 and pump sliding member 331, and layer 220*b* making contact with groove-shaped valve seats 250*a* and pump groove 260*a* is preferably a layer having elasticity.

The material contained in flexible layer 220 is not particularly limited and is appropriately selected from known resins. When flexible layer 220 is formed of a plurality of layers, flexible layer 220 includes, for example, polyethylene terephthalate, polycarbonate, polymethyl methacrylate, polyvinyl chloride, polypropylene, polyether, polyethylene, polystyrene, cycloolefin-based resin, silicone resin, and the like in layer 220*a* facing valve sliding member 321 and pump sliding member 331. Meanwhile, an elastomer or the like is included in layer 220*b* making contact with groove-like valve seats 250*a* or pump groove 260*a* in flexible layer 220. In the present embodiment, flexible layer 220 is composed of two layers, in which layer 220*a* making contact with valve sliding member 321 and the like includes a cycloolefin-based resin, and layer 220*b* making contact with groove-like valve seats 250*a* or pump groove 260*a* includes an elastomer.

Here, the thickness of entire flexible layer 220 is appropriately selected depending on the material and the like of flexible layer 220, and is, for example, 30 µm or greater and 600 µm or less. The thickness of layer (elastic layer) 220*b* making contact with groove-shaped valve seats 250*a* and pump groove 260*a* is preferably greater than the depth of groove-shaped valve seats 250*a* and pump groove 260*a* in board 210, and is, for example, greater than or equal to 25 µm and less than or equal to 500 µm.

Flexible layer 220 is bonded to the back surface of board 210 so as to close opening portions of the grooves and/or through holes in board 210. The bonding method is not particularly limited, and thermal welding, laser welding, adhesive, or the like can be applied. Further, flexible layer 220 may be optically transparent but does not have to be optically transparent. The optical transparency of flexible layer 220 is appropriately selected depending on the application of fluid handling device 200. Further, in the present embodiment, although one flexible layer 220 is disposed to cover entire board 210 (first grooves 231*a*, second groove 240*a*, vent groove 232*a*, groove-like valve seats 250*a*, pump groove 260*a*, and the like), flexible layer 220 may be divided into a plurality of sections.

Here, in fluid handling device 200 according to the present embodiment, a region delimited by each through hole 230*a* in board 210 and flexible layer 220 serves as well 230. Each well 230 is a bottomed recess having an opening on the front side, which functions as an introduction portion for introducing a fluid into a channel in fluid handling device 200, an extraction portion for extracting the fluid in the channel in fluid handling device 200, a treatment portion for mixing or reacting a fluid, a vent hole used during movement of a fluid in the channel in fluid handling device 200, or the like. Also, when liquid is used as fluid, well 230 can receive the liquid.

The shape and size of well 230 are not particularly limited as long as the above functions can be exhibited. The shape of the internal space of well 230 is, for example, a substantially frusto-conical shape or a substantially cylindrical shape. In the present embodiment, the shape of the internal space of well 230 is a frusto-conical shape. In the present embodiment, an outer wall surrounding the inner space of well 230 protrudes from the surface of board 210 on the front side of fluid handling device 200. The protrusion functions as the outer wall of well 230. The number of wells 230 is not particularly limited and is appropriately selected depending on the application of fluid handling device 200

In the present embodiment, ten wells 230 out of the plurality of wells 230 (left five wells 230 in an upper row and left five wells 230 in a lower row in FIG. 6A) are connected to valves 250 via first channels 231, and function as the fluid introduction portion, the fluid extraction portion, the treatment portion, and/or the like. One well 230 of the plurality of wells 230 (fifth well 230 from the right in the lower row in FIG. 6A) is connected to pump 260 via vent channel 232, and functions as the vent hole. In fluid handling device 200 according to the present embodiment, other wells 230 are not used.

In addition, a region delimited by flexible layer 220 and each of first grooves 231*a* serves as first channel 231, a region delimited by flexible layer 220 and second groove 240*a* serves as second channel 240, and a region delimited by flexible layer 220 and vent groove 232*a* serves as vent channel 232.

First channels 231 connect together the plurality of wells 230 and valves 250. The cross-sectional area and the cross-sectional shape of first channel 231 are not particularly limited. The cross-sectional shape of first channel 231 is not particularly limited, and is, for example, a substantially rectangular shape with sides having lengths (width and depth) of about several tens of µm. In the present specification, the "cross section of the channel" means a cross section of the channel orthogonal to the direction in which the fluid flows. In the present embodiment, the width of first channel 231 is greater than the widths of groove-shaped valve seat 250*a* and second groove 240*a*.

Second channel 240 is a channel disposed between valves 250 and pump 260. The cross-sectional area and the cross-sectional shape of second channel 240 are not particularly limited. The cross-sectional shape of second channel 240 is not particularly limited, and is, for example, a substantially rectangular shape with sides having lengths (width and depth) of about several tens of µm. The cross-sectional area of second channel 240 may be constant in the flow direction of the fluid, but does not have to be constant.

The number and shape of second channel 240 are not particularly limited and are appropriately selected depending on the application of fluid handling device 200. In the present embodiment, as illustrated in FIG. 5, fluid handling device 200 includes one second channel 240 including a branch. That is, second channel 240 includes two branch channels 241 and 242 and one common channel 243. One end portion of each of two branch channels 241 and 242 is connected to one end portion of common channel 243. Two branch channels 241 and 242 extend in a circumferential direction. Valves 250 are disposed between, on one hand, two branch channels 241 and 242 and, on the other hand, a plurality of first channels 231. The other end portion of common channel 243 is connected to pump 260.

Vent channel 232 is a channel connecting well 230 serving as the vent hole and pump 260, and is a channel mainly allowing gas to flow. The cross-sectional area and the cross-sectional shape of vent channel 232 are not particularly limited. The cross-sectional shape of vent channel 232 is not particularly limited, and is, for example, a substantially rectangular shape with sides having lengths (width and depth) of about several tens of μm.

In addition, groove-shaped valve seats 250a and flexible layer 220 form valves 250. Fluid handling device 200 of the present embodiment includes a plurality of valves 250. These valves 250 are disposed between, on one hand, the plurality of wells 230 (the plurality of first channels 231) and, on the other hand, second channel 240, and control the flow of the fluid from the first channel 231 side to the second channel 240 side or the flow of the fluid from the second channel 240 side to the first channel 231 side. In the open state of valves 250, each of valves 250 is a channel for communicating between first channel 231 and second channel 240. On the other hand, in the closed state of valves 250, each of valves 250 blocks the communication between first channel 231 and second channel 240.

In valves 250, when first protrusion 322 of valve sliding member 321 of fluid handling system 300, which will be described later, does not sufficiently push flexible layer 220 into groove-shaped valve seats 250a and there are gaps between flexible layer 220 and groove-shaped valve seats 250a, valves 250 are in the open state (see FIG. 7A). On the other hand, when the protrusion of valve sliding member 321 pushes flexible layer 220 into groove-shaped valve seats 250a and the inner walls (side surfaces and bottom surfaces) of groove-shaped valve seats 250a come into contact with flexible layer 220, valves 250 are in the closed state (see FIG. 7B). That is, in valves 250, groove-shaped valve seats 250a function as valve seats, and flexible layer 220 functions as a valve body.

Figure 8:
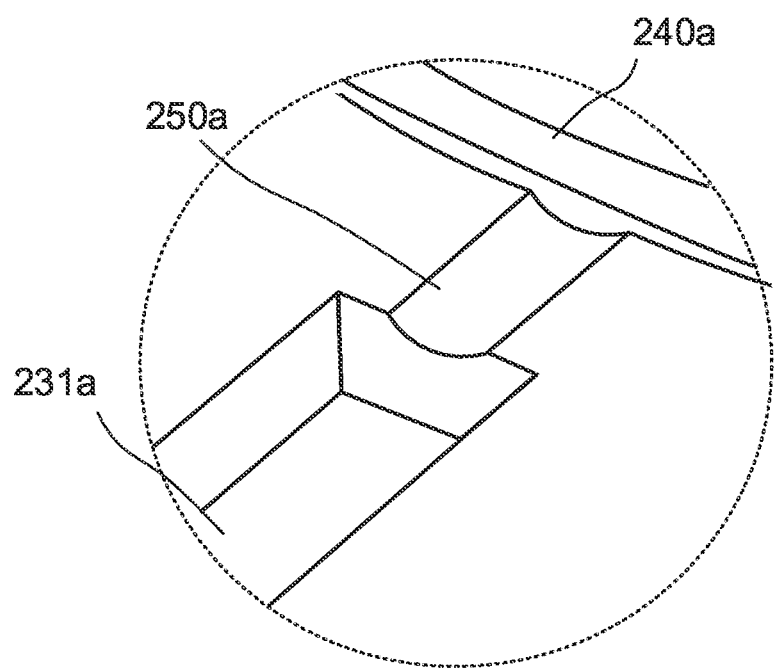
FIG. 8 is a partially enlarged perspective view of a portion indicated by a broken line in FIG. 6C.

Here, the shape of each groove-shaped valve seats 250a is not particularly limited as long as the inner wall (bottom and side surfaces) of groove-shaped valve seat 250 comes into tight contact with the surface of flexible layer 220 when flexible layer 220 is pressed toward groove-shaped valve seat 250a by first protrusion 322 of valve sliding member 321. FIG. 8 illustrates a partially enlarged perspective view of a portion indicated by broken line in FIG. 6C. As illustrated in FIG. 8, in the present embodiment, the width of groove-like valve seat 250a is designed to be narrower than the width of first groove 231a (first channel 231) and the width of second groove 240a (second channel 240). The depth of groove-shaped valve seat 250a is designed to be shallower than the depth of first channel 231 (first groove 231a) and the depth of second channel 240 (second groove 240a) and is equal to or less than T*(F/A)/E. Here, "T" denotes the thickness of flexible layer 220, "F" denotes the pressing force of first protrusion 322 of valve sliding member 321 of fluid handling system 300 described later, "A" denotes the pressed area of a press by first protrusion 322 (in the present embodiment, the area of the top surface of first protrusion 322), and "E" denotes the Young's modulus of flexible layer 220a. The depth is, for example, about 5 to 100 μm. Further, it is preferable that a cross section of groove-shaped valve seat 250a taken perpendicularly to the longitudinal direction have a shape enclosed by a circular arc or an elliptical arc and a chord thereof, for example, an arcuate shape. When the side surface and the bottom surface of groove-shaped valve seat 250a continue smoothly to each other, it is likely that flexible layer 220 (220b) and the inner wall of groove-shaped valve seat 250a come into tight contact with each other without a gap being present in between in the closed state of valve 250, as illustrated in FIG. 7B. However, the shape is not limited to the above. In addition, the length of groove-shaped valve seat 250a is not particularly limited, and may be any length as long as the fluid can be sufficiently intercepted by flexible layer 220 making contact with the inner wall of groove-shaped valve seat 250a when flexible layer 220 is pressed toward the groove-shaped valve seat 250a side by first protrusion 322 of valve sliding member 321. The length is, for example, about 50 to 500 μm.

The number of valves 250 is not particularly limited, and is appropriately selected according to the application of fluid handling device 200. In the present embodiment, fluid handling device 200 has ten valves 250 corresponding to the number of first channels 231. Further, in the present embodiment, a plurality of valves 250 are disposed along the circumference of one circle. When fluid handling device 200 is housed in chip holder 310, the center of the circle is located on first central axis CA1 serving as the rotational axis of valve sliding member 321 (rotary member) (see FIGS. 4 and 5). Thus, the plurality of valves 250 can function as a rotary valve which is controlled by the rotation of valve sliding member 321 to be opened and closed.

In addition, pump groove 260a and flexible layer 220 form pump (membrane pump) 260. Pump 260 is a member for controlling the flow of the fluid in first channels 231 and second channel 240, and one end portion of pump 260 is connected to second channel 240. The other end portion of the pump is connected, through vent channel 232, to well 230 functioning as the vent hole. Pump 260 is driven like a peristaltic pump by being pressed by pump control section 330. The shape of pump 260 in plan view is not particularly limited, but in the present embodiment, it is substantially a circular arc shape ("C" shape).

At pump 260 of the present embodiment, when second protrusions 332 of pump sliding member 331 to be described later presses flexible layer 220 while sliding on it, the contact position between the inner wall of flexible layer 220 and pump groove 260a is moved sequentially. As a result, the fluid in first channel 231 and second channel 240 flows. For example, when second protrusions 332 (to be described later) of pump sliding member 331 press flexible layer 220 while sliding on the flexible layer from a connection portion between pump 260 and second channel 240 toward the vent channel 232 side (counterclockwise in FIG. 5), the fluid in second channel 240 moves toward pump 260 and the inside of second channel 240 comes to be at a negative pressure. Meanwhile, the fluid in pump 260 moves toward vent channel 232, and the inside of vent channel 232 comes to be at a positive pressure. When second protrusions 332 press flexible layer 220 while sliding on the flexible layer from the connection portion between pump 260 and vent channel 232 toward the second channel 240 side (clockwise in FIG. 5), the fluid in vent channel 232 moves toward pump 260 and the inside of vent channel 232 comes to be at a negative pressure. Meanwhile, the fluid in pump 260 moves toward second channel 240, and the inside of second channel 240 comes to be at a positive pressure. In this manner, pump 260 can cause the fluid in first channel 231 and/or second channel 240 to flow in a desired direction.

Here, in the present embodiment, as illustrated in FIGS. 6A to 6C, the width of pump groove 260a is designed to be narrower than the width of second groove 240a (second channel 240). Further, the depth of pump groove 260a is designed shallower than the depth of second groove 240a (second channel 240). The depth is, for example, about 5 to 100 µm. Further, in the present embodiment, the cross-sectional shape of pump groove 260a orthogonal to the circumference is not particularly limited as long as the inner wall (bottom and side surface) of pump groove 260a and the surface of flexible layer 220 make tight contact with each other, and a shape enclosed by a circular arc or an elliptical arc and a chord thereof, for example, an arcuate shape, is preferable. When the side surface and the bottom surface of pump groove 260a continue smoothly to each other, it is likely that flexible layer 220 and the inner wall of pump groove 260a come into tight contact with each other without a gap being present in between when pump 260 is driven. However, the shape is not limited to the above.

In the present embodiment, pump 260 (pump groove 260a) is disposed along the circumference of one circle. When fluid handling device 200 is housed in chip holder 310, the center of the circle is located on second central axis CA2 serving as a rotary axis of pump sliding member 331 (rotary member). Thus, pump 260 can function as a rotary pump whose operation is controlled by the rotation of pump sliding member 331.

Configuration of Fluid Handling System

Fluid handling system 300 includes chip holder 310 for holding fluid handling device (channel chip) 200, valve control section 320 for controlling the opening and closing of valves 250 of fluid handling device 200 held in chip holder 310, and pump control section 330 for controlling the operation of pump 260 of fluid handling device 200 held in chip holder 310. Fluid handling system 300 of the present embodiment further includes control section 360 disposed in chip holder 310, storage 370, and housing 380.

Chip holder 310 includes accommodation portion 311 for accommodating fluid handling device 200 and is fixed to the main body of fluid handling system 300. The shape of accommodation portion 311 is not particularly limited as long as it can appropriately accommodate and fix fluid handling device 200. In the present embodiment, accommodation portion 311 is a substantially rectangular parallelepiped-shaped hollow body having opening portions in the back surface side (upper side in the figure of FIG. 1), the top surface side, and the bottom surface side of fluid handling system 300. Fluid handling device 200 is put in and removed from accommodation portion 311 through the opening portion in the back surface side (see FIG. 3C). The positions of the opening portions are not limited to these positions. Also, the shapes of the opening portions may be any shape as long as fluid handling device 200 can be put in and removed therethrough.

Further, the structure of the interior of accommodation portion 311 is not particularly limited as long as fluid handling device 200 can be held such that the position of fluid handling device 200 is not shifted when fluid handling device 200 is pressed against valve sliding member 321 and pump sliding member 331 or when valve sliding member 321 or pump sliding member 331 is rotated. In the present embodiment, the interior of accommodation portion 311 is a substantially rectangular parallelepiped-shaped space having a height, a width, and a depth substantially equal to the height, the width, and the depth of the laminate of fluid handling device 200 and spacer 312. As described above, in fluid handling device 200, the wall surrounding well 230 protrudes from the surface of board 210. Therefore, in the present embodiment, fluid handling device 200 and spacer 312 are accommodated in accommodation portion 311 in a state in which spacer 312 having a thickness equal to or greater than the height of the wall is disposed on fluid handling device 200 in a region where no well 230 exists. Note that, a groove for fixing fluid handling device 200 at a predetermined position, a stopper for fixing fluid handling device 200, and/or the like may be formed in/on the inside of accommodation portion 311. Further, an elastic member (not illustrated) for adjusting the inclination of fluid handling device 200 or suppressing a positional deviation of fluid handling device 200 when fluid handling device 200 is pressed against valve sliding member 321 and pump sliding member 331 may be disposed inside accommodation portion 311.

Through holes for allowing fluid handling device 200 accommodated in accommodation portion 311 to make contact with valve sliding member 321 and pump sliding member 331 are formed in the bottom plate of accommodation portion 311. The shape of the through holes is not particularly limited as long as the through holes do not hinder the contact between flexible layer 220 of valves 250 of fluid handling device 200 and first protrusion 322 of valve sliding member 321 and the contact between flexible layer 220 of pump 260 and second protrusions 332 of pump sliding member 331.

Meanwhile, a substantially rectangular cutout for facilitating accommodation and removal of fluid handling device 200, a through hole for introducing a fluid into fluid handling device 200 or extracting the fluid from fluid handling device 200, a through hole for observing the fluid in fluid handling device 200, a through hole for observing the operation of valve sliding member 321 and pump sliding member 331, and the like are formed in the top plate of accommodation portion 311. When valve sliding member 321 and pump sliding member 331 are pressed against fluid handling device 200, the top plate of accommodation portion 311 supports fluid handling device 200. Therefore, in the present embodiment, the thickness of the top plate of accommodation portion 311 is larger than the thickness of the bottom plate of the accommodation portion.

Valve control section 320 controls the opening and closing of valves 250 of fluid handling device 200 held in chip holder 310. The configuration of valve control section 320 is not particularly limited as long as it is possible to control the opening and closing of the plurality of valves 250, and for example, is a plurality of solenoid actuators or the like. In the present embodiment, valve control section 320 includes valve sliding member 321 (rotary member), and first drive section 324 for rotating valve sliding member 321 about first central axis CA1.

Figure 9A:
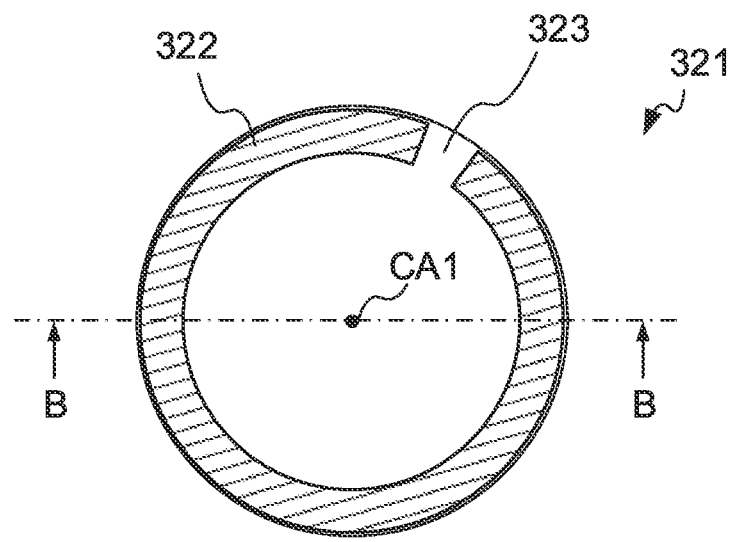
FIG. 9A is a plan view of a valve sliding member.
Figure 9B:
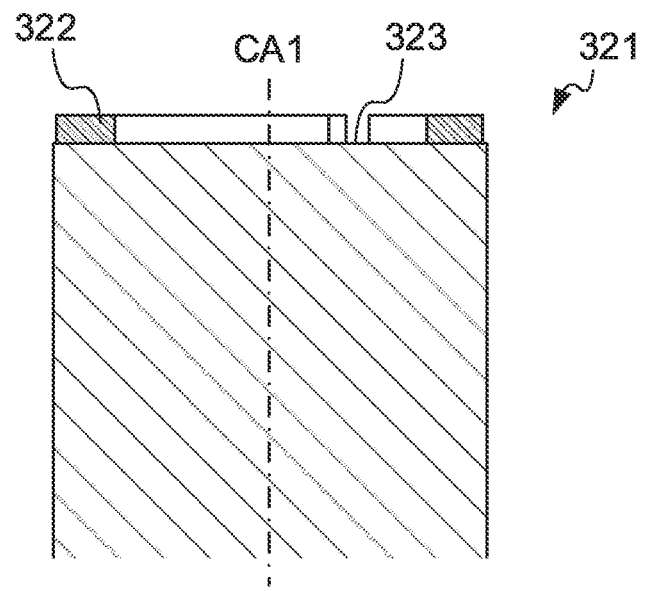
FIG. 9B is a sectional view taken along line B-B in FIG. 9A.

FIG. 9A is a plan view of valve sliding member 321, and FIG. 9B is a sectional view taken along line B-B in FIG. 9A. In FIG. 9A, for clarity, the top surface of first protrusion 322 is hatched.

As illustrated in FIGS. 9A and 9B, valve sliding member 321 has first protrusion 322 and first recess 323 disposed on/in the top surface of the cylindrical body. Valve sliding member 321 is rotatable about first central axis CA1. Valve sliding member 321 is rotated by first drive section 324.

First protrusion 322 presses flexible layer 220 on groove-shaped valve seats 250a to close valves 250. First recess 323 does not press flexible layer 220 to allow valve 250 to open. First protrusion 322 and first recess 323 are disposed along the circumference of the circle around first central axis CA1. In the present embodiment, the shape of first protrusion 322 as seen in plan view is a circular arc shape corresponding to a portion of the circle around first central axis CA1 (shape of "C"). A region along the circumference where first protrusion 322 does not exist is first recess 323.

Note that first protrusion 322 only needs to protrude relative to first recess 323 and to press the flexible layer at a desired position so as to be capable of bringing flexible layer 220 of fluid handling device 200 and groove-shaped valve seat 250a into tight contact with each other. Further, first recess 323 only needs to have a shape that is recessed relative to first protrusion 322 so as not to push flexible layer 220 into groove-shaped valve seat 250a. That is, first protrusion 322 only needs to function as a pressing portion, and first recess 323 only needs to function as a non-pressing portion. For example, in the example illustrated in FIG. 9B, first protrusion 322 protrudes from the top surface of the main body (reference surface), and the bottom surface of first recess 323 is a surface at the same height as the top surface of the main body (reference surface). Conversely, the top surface of first protrusion 322 may be a surface at the same height as the top surface (reference surface) of the main body, and in this case, first recess 323 is recessed from the top surface (reference surface) of the main body.

First drive section 324 rotates valve sliding member 321 according to an instruction of control section 360 by any angle in any direction. The configuration of first drive section 324 is not particularly limited, and for example, is a motor that is directly connected to valve sliding member 321, or connected to valve sliding member 321 via a power transmission section such as a gear.

Pump control section 330 controls the operation of pump 260 of fluid handling device 200 held in chip holder 310. The configuration of the pump control section 330 is not particularly limited as long as the operation of pump 260 can be controlled, and, for example, is a push roller or the like that can move along the extending direction of pump 260 (pump groove 260a). In the present embodiment, pump control section 330 includes pump sliding member 331 (rotary member), and second drive section 334 for rotating pump sliding member 331 about second central axis CA2.

Figure 10A:
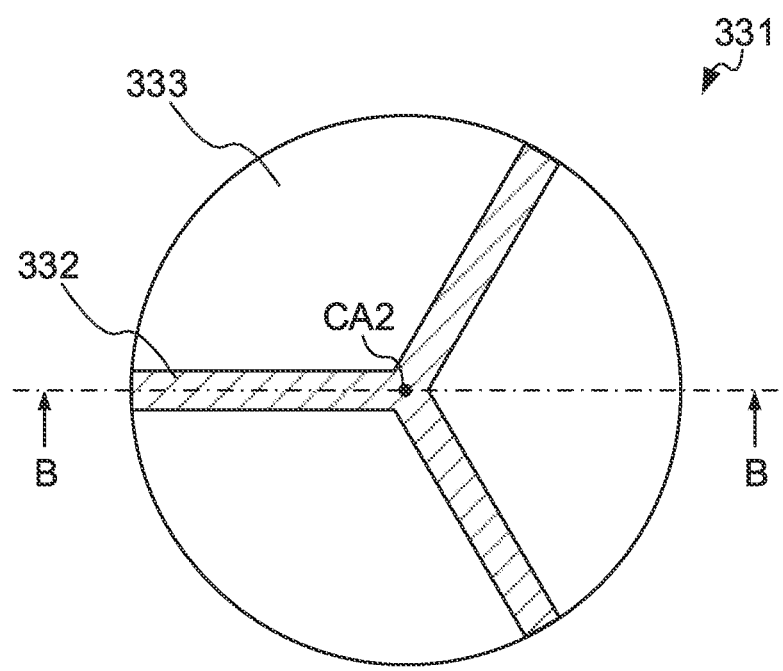
FIG. 10A is a plan view of a pump sliding member.
Figure 10B:
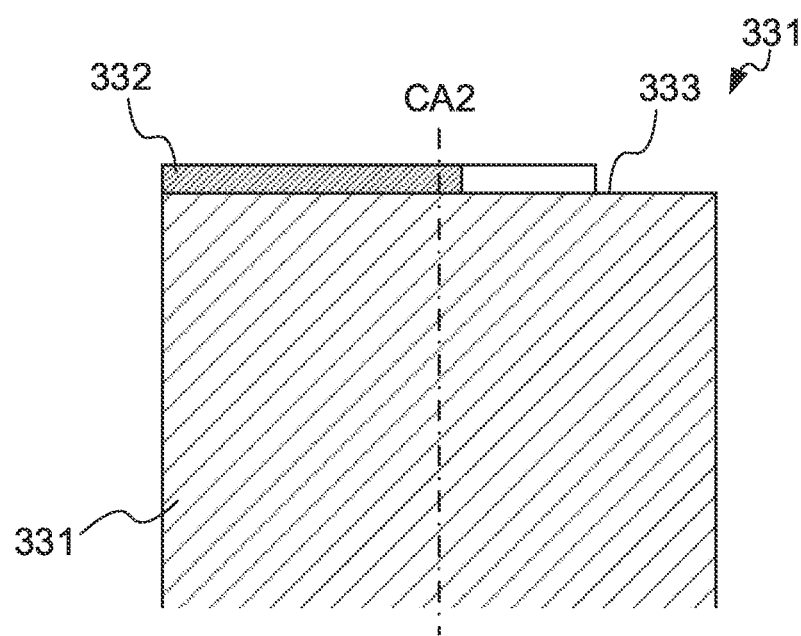
FIG. 10B is a sectional view taken along line B-B in FIG. 10A.

FIG. 10A is a plan view of pump sliding member 331, and FIG. 10B is a sectional view taken along line B-B in FIG. 10A. In FIG. 10A, the top surfaces of second protrusions 332 are hatched for the sake of clarity.

Pump sliding member 331 has second protrusions 332 and second recesses 333 disposed on/in the top surface of the cylindrical body. Pump sliding member 331 is rotatable about second central axis CA2. Pump sliding member 331 is rotated by second drive section 334.

Second protrusions 332 press flexible layer 220 of fluid handling device 200, thereby bringing flexible layer 220 and the inner wall of pump groove 260a into tight contact with each other. Further, second protrusions 332 slide on flexible layer 220 to drive pump 260. Second recesses 333 are portions other than second protrusions 332. Second protrusions 332 are disposed on the circumference of the circle around second central axis CA2. The number and shape of second protrusions 332 are not particularly limited as long as pump 260 can be appropriately operated. In the present embodiment, pump sliding member 331 has three second protrusions 332, and the shape of each of second protrusions 332 as seen in plan view is a substantially rectangular shape extending outward from second central axis CA2.

Second protrusions 332 only need to protrude relative to second recesses 333, and press flexible layer 220 at a desired position so as to bring flexible layer 220 of fluid handling device 200 and pump groove 260a into tight contact with each other. In addition, each of second recesses 333 only needs to have a shape that is recessed relative to second protrusions 332 and does not push flexible layer 220 into pump groove 260a. That is, second protrusions 332 only need to function as the pressing portion, and second recesses 333 only need to function as the non-pressing portion. For example, in the example illustrated in FIG. 10B, second protrusions 332 protrude from the top surface of the main body (reference surface), and the bottom surfaces of second recesses 333 are surfaces at the same height as the top surface of the main body (reference surface). Conversely, the top surfaces of second protrusions 332 may be surfaces at the same height as the top surface (reference surface) of the main body, and in this case, second recesses 333 are recessed from the top surface (reference surface) of the main body.

Second drive section 334 rotates pump sliding member 331 according to an instruction of control section 360 by any angle in any direction. The configuration of the second drive section 334 is not particularly limited, and for example, is a motor or the like that is directly connected to pump sliding member 331, or connected to pump sliding member via a power transmission section such as a gear.

Control section 360 controls valve control section 320 (first drive section 324), pump control section 330 (second drive section 334), and the like. Specifically, control section 360 operates valve control section 320 (first drive section 324), pump control section 330 (second drive section 334), and/or the like according to the program stored in storage 370, or an instruction of the operation setting system. Storage 370 stores various programs and the like. Control section 360 and storage 370 are, for example, a microcomputer.

Housing 380 houses the components of fluid handling system 300 other than chip holder 310 and supports chip holder 310. The structure of housing 380 is not particularly limited as long as the above-described functions can be exhibited. In the present embodiment mode, housing 380 has a substantially rectangular parallelepiped shape, but may have any shape. In the present embodiment, housing 380 is made of resin, but may be made of metal. Examples of the resin material constituting housing 380 include polyethylene terephthalate, polycarbonate, polymethyl methacrylate, polyvinyl chloride, polypropylene, polyether, polyethylene, polystyrene, silicone resin, and elastomer. Housing 380 may be formed of a plurality of kinds of materials.

In the present embodiment, fluid handling system 300 includes a plurality of buttons, a jack in which a plug of AC adapter 410 is to be inserted, a socket in which a plug of USB cable 420 is to be inserted, and the like (see FIGS. 1 and 2).

Fluid handling system 300 may further include an internal power source, a display, and the like.

Variations

Although fluid handling device 200 and fluid handling system 300 including the same have both valve 250 and pump 260, the fluid handling device and the fluid handling system including the same may have only one of them.

Further, fluid handling system 300 described above may include a light source (not illustrated) used for detecting fluid movement or observing the fluid, and/or a light detection section (not illustrated) for detecting light from the light source. For example, the light source and the light detection section are disposed to face each other across second channel 240. In this case, the light source emits light to second channel 240, and the intensity of the light from the light source is detected by the light detection section. It is thus possible to identify whether or not the fluid is present in second channel 240. It is preferable that the light detection section be connected to control section 360. Based on a signal detected by the light detection section, control section 360 may control valve control section 320 and pump control section 330. Note that, a plurality of light sources and light detection sections may be disposed to detect a fluid reaching a predetermined position or the like. The type of the light source is not particularly limited, and can be infrared rays, for example.

Further, in the above, valves 250 are disposed along the circumference of one circle and controlled by the rotary valve (valve sliding part), but not limited to this configuration. For example, valves 250 may be disposed along the circumferences of two or more concentric circles, which may be appropriately controlled by valve sliding member 321.

Although the number of groove-shaped valve seats 250a included by one valve 250 is one in the above description, one valve 250 may include a plurality of groove-shaped valve seats 250a.

Furthermore, although only one pump groove 260a of pump 260 is disposed in the above description, a plurality of pump grooves 260a may be disposed in order to increase the volume of fluid that can flow in pump 260. For example, arrangement of a plurality of pump grooves 260a along concentric circles is also possible.

Operation of Fluid Handling System

One example of a method for handling a fluid using fluid handling system 100 will be described below. Here, referring to the schematic views of FIGS. 11A to 12B, a description will be given of an example in which a liquid contained in a second one of wells 230 (hereinafter also referred to as "introduction well") from the left in the upper row in the figure is moved to a second one of wells 230 (hereinafter also referred to as "extraction well") from the left in the lower row in the figure. FIGS. 11A to 12B illustrate a region in the vicinity of a plurality of valves 250 of fluid handling device 200 as seen from the front side, and illustration of the outer walls or the like of wells 230 are omitted. Of the plurality of valves 250, valves 250 in the closed state that are being pressed by first protrusion 322 of valve sliding member 321 are illustrated in black, and valve 250 in the open state that faces first recess 323 of valve sliding member 321 is illustrated in white.

To begin with, fluid handling device 200 on which spacer 312 is stacked is accommodated in accommodation portion 311 of chip holder 310 (see FIGS. 3B and 3C). Chip holder 310 accommodating fluid handling device 200 is then fixed at a predetermined position on housing 380. Fluid handling device 200 accommodated in chip holder 310 is pressed against valve sliding member 321 and pump sliding member 331 with a predetermined force.

Note that, before, during, or after installation of chip holder 310, valve sliding member 321 and pump sliding member 331 may be rotated to adjust rotation start positions of valve sliding member 321 and pump sliding member 331. Further, after fixing chip holder 310, valve sliding member 321 and pump sliding member 331 may be further moved to the fluid handling device 200 side if necessary, to adjust the pressing force of valve sliding member 321 and pump sliding member 331 to fluid handling device 200 (see FIG. 4).

Figure 11A:
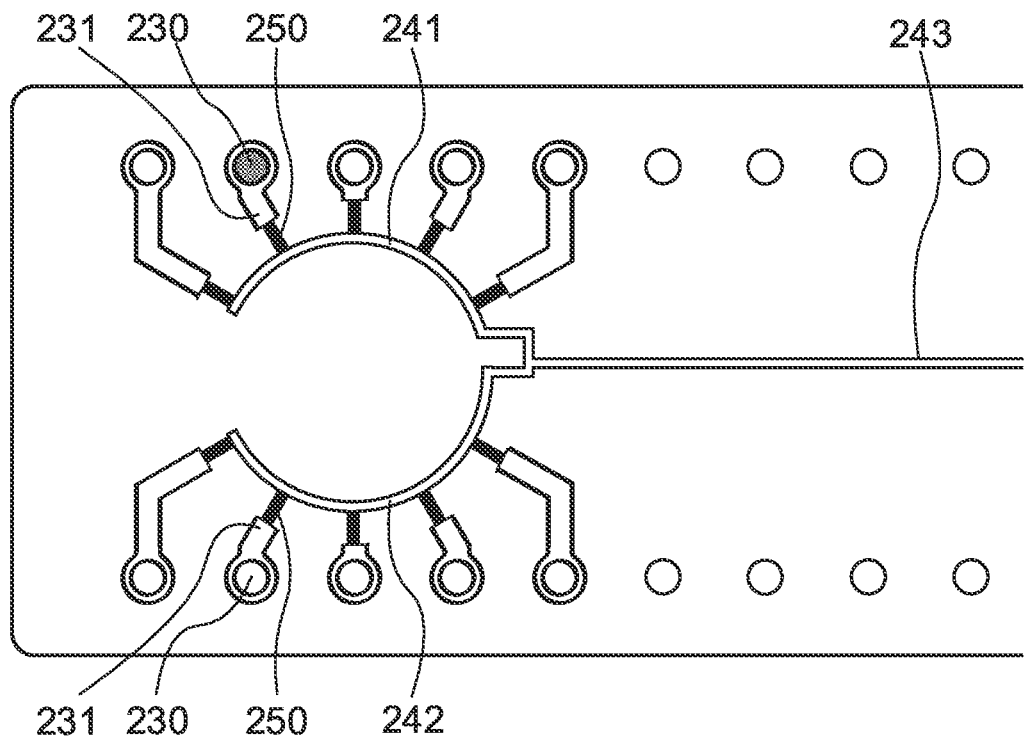
FIGS. 11A and 11B are schematic view illustrating handling a fluid using the fluid handling system.

A fluid is then introduced into a predetermined one of wells 230 in fluid handling device 200. In the present embodiment, as illustrated in FIG. 11A, a predetermined liquid is introduced into introduction well 230, the second one of the wells from the left in the upper row in the figure. For example, a user uses a pipette to introduce the liquid into introduction well 230 through the through hole in the top plate of chip holder 310 and the through hole in spacer 312

Thereafter, while applying a pressing force such that first protrusion 322 of valve sliding member 321 and second protrusions 332 of pump sliding member 331 sufficiently press flexible layer 220 of fluid handling device 200, valve sliding member 321 and pump sliding member 331 are rotated to drive the opening or closing of valves 250 and pump 260. When flexible layer 220 of valves 250 of fluid handling device 200 is pushed into groove-shaped valve seats 250a by first protrusion 322 of valve sliding member 321 by the rotation of valve sliding member 321, valves 250 are brought into the closed state. On the other hand, when first recess 323 is disposed to groove-shaped valve seat 250a after the rotation of valve sliding member 321, the pressure on flexible layer 220 is released and valve 250 is brought into the open state. Further, when flexible layer 220 of pump 260 of fluid handling device 200 is pushed into pump groove 260a by second protrusion 332 of pump sliding member 331 after the rotation of pump sliding member 331 and when second protrusion 332 moves in this state, the fluid in the channel is moved. It is possible to treat or mix desired fluids by utilizing the opening and closing of valves 250 and the movement of the fluid.

Figure 11B:
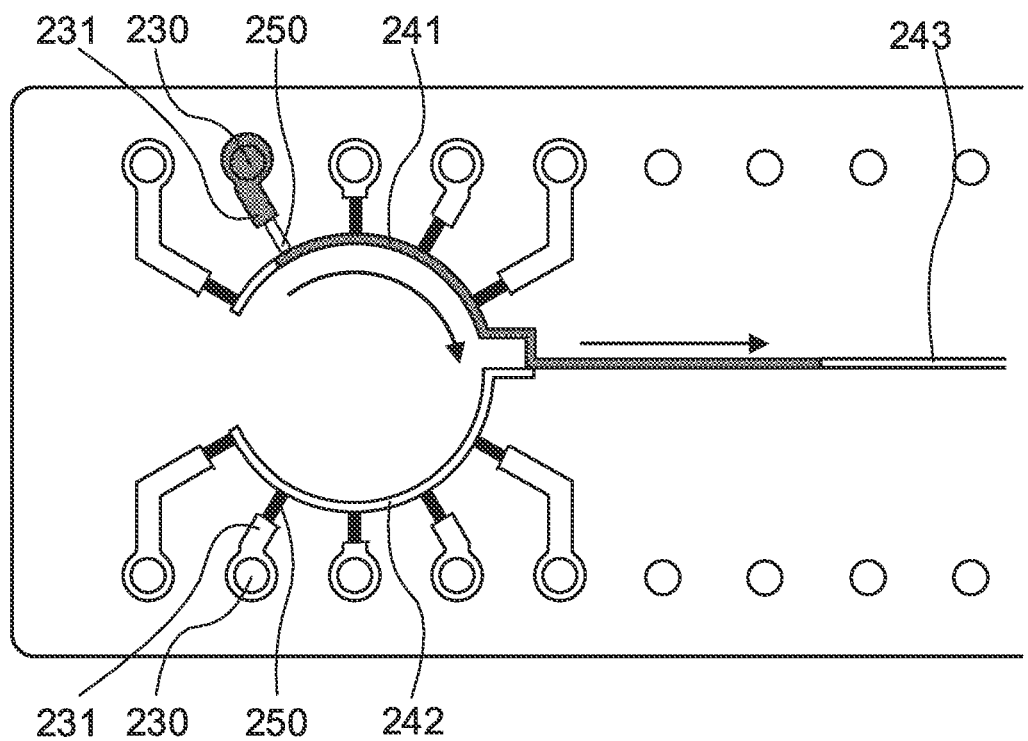

In this example, as illustrated in FIG. 11B, control section 360 rotates valve sliding member 321 first, to move first recess 323 to valve 250 corresponding to introduction well 230. As a result, introduction well 230 and common channel 243 communicate with each other. Next, control section 360 rotates pump sliding member 331 to suck the liquid in introduction well 230 into common channel 243. When the liquid reaches a predetermined position in common channel 243, control section 360 stops the rotation of pump sliding member 331 and stops the suction into common channel 243.

Figure 12A:
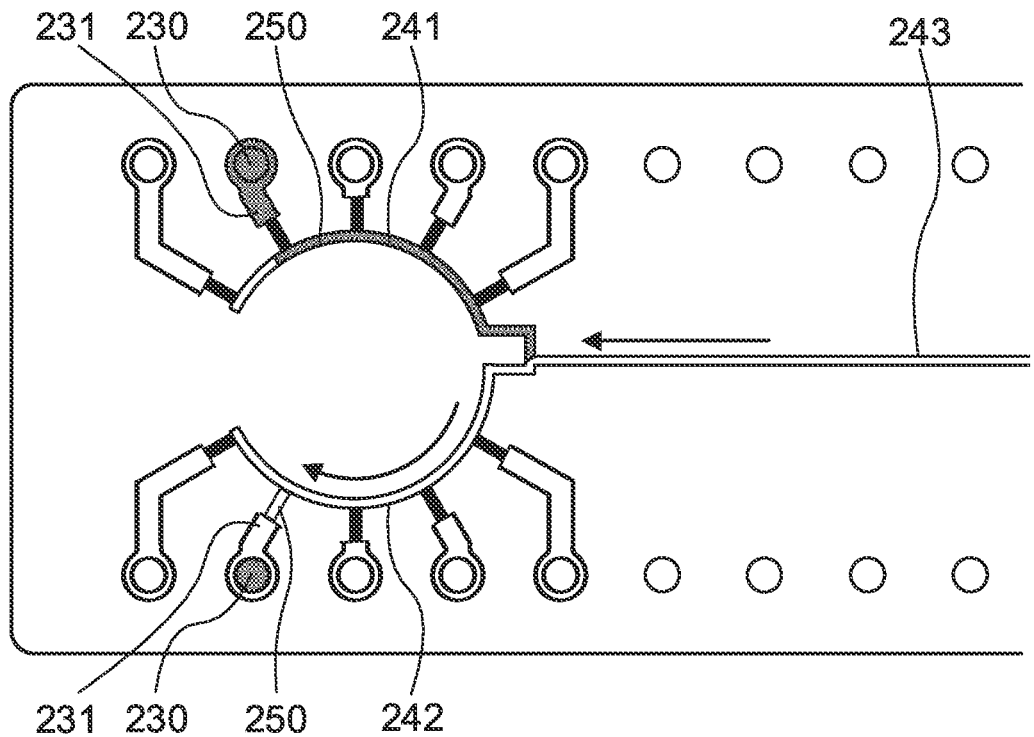
FIGS. 12A and 12B schematically illustrate handling a fluid using the fluid handling systems.

Then, as illustrated in FIG. 12A, control section 360 rotates valve sliding member 321 to move first recess 323 to valve 250 corresponding to extraction well 230, the second one of the wells from the left in the lower row in the figure. As a result, common channel 243 and extraction well 230 communicate with each other. Next, control section 360 rotates pump sliding member 331 to push the liquid in common channel 243 into extraction well 230. Pump sliding member 331 is rotated until all of the liquid in common channel 243 moves into extraction well 230. Then, control section 360 stops the rotation of pump sliding member 331 and stops extrusion into extraction well 230.

Figure 12B:
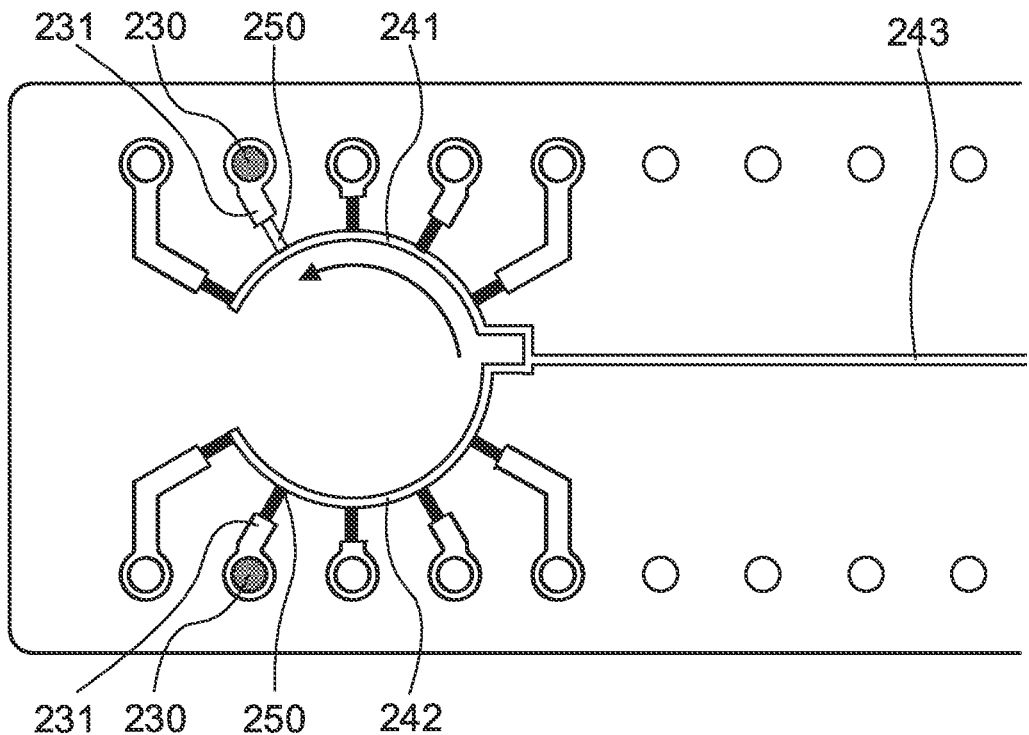

Finally, as illustrated in FIG. 12B, control section 360 rotates valve sliding member 321, to move first recess 323 again to valve 250 corresponding to introduction well 230. Thus, common channel 243 and introduction well 230 communicate with each other again. Next, control section 360 rotates pump sliding member 331 to push the liquid remaining in branch channel 241 into introduction well 230. Pump sliding member 331 is rotated until all the liquid in branch channel 241 moves into introduction well 230. Then, control section 360 stops the rotation of pump sliding member 331 and stops extrusion into introduction well 230.

By the above procedure, a predetermined amount of liquid can be measured and obtained from the liquid contained in introduction well 230 (the second one of the wells from the left in the upper row in the figure) and can be moved to extraction well 230 (the second one of the wells from the left in the lower row in the figure).

Effect

As described above, the fluid handling device according to the present embodiment is composed of the board and the flat plate-shaped flexible layer. The fluid handling device has a simple configuration. Also, there is no need to mold the flexible layer and to finely position the board and the flexible layer to each other. In addition, since the flexible layer is not molded, it is also possible to bond the board and the flexible layer at a high temperature, resulting in a highly reliable fluid handling device and/or system. Further, since the flexible layer has a flat plate shape, it is also possible to miniaturize the fluid handling device and the fluid handling system including the same.

INDUSTRIAL APPLICABILITY

The fluid handling device according to the present embodiment and the fluid handling system using the same are useful in various applications such as clinical tests, food tests, and environmental tests, for example.

REFERENCE SIGNS LIST

200 Fluid handling device
210 Board
220 Flexible layer
230 Well
231 First flow channels
231*a* First groove
232 Vent channel
240 Second channel
240*a* Second groove
241, 242 Branch channel
243 Common channel
250 Valve
250*a* Groove-shaped valve seat
260 Pump
260*a* Pump groove
300 Fluid handling system
310 Tip holder
312 Spacer
320 Valve control section
321 Valve sliding member
322 Protrusion
324 First drive section
330 Pump control section
331 Pump sliding member
332 Protrusion
334 Second drive section
360 Control section
370 Storage
380 Housing
410 AC adapter
420 USB cable

The invention claimed is:

1. A fluid handling device, comprising:
a first channel;
a second channel;
a valve disposed between the first channel and the second channel;
a pump connected to the second channel;
a board; and
a flat plate-shaped flexible layer bonded to the board, wherein
the board includes a first groove, a second groove, a groove-shaped valve seat disposed between the first groove and the second groove, and a pump groove,
the flat plate-shaped flexible layer covers the first groove, the second groove, the groove-shaped valve seat, and the pump groove,
the first channel is a region delimited by the first groove and the flat plate-shaped flexible layer,
the second channel is a region delimited by the second groove and the flat plate-shaped flexible layer,
the valve includes the groove-shaped valve seat and the flat plate-shaped flexible layer covering the groove-shaped valve seat,
the valve communicates between the first channel and the second channel when the flat plate-shaped flexible layer and an inner wall of the groove-shaped valve seat are spaced apart from each other, and blocks communication between the first channel and the second channel when the flat plate-shaped flexible layer and the inner wall of the groove-shaped valve seat are in contact with each other,
the pump includes the pump groove disposed in the board and the flat plate-shaped flexible layer covering the pump groove, and
the pump moves a fluid in the first channel and/or the second channel by sequentially moving a contact position between the flat plate-shaped flexible layer and an inner wall of the pump groove.

2. The fluid handling device according to claim 1, wherein a depth of the groove-shaped valve seat is less than a depth of the first groove and a depth of the second groove.

3. The fluid handling device according to claim 1, wherein a shape of a cross section of the groove-shaped valve seat is a shape enclosed by a circular arc or elliptical arc and a cord, the cross section being taken perpendicularly to a longitudinal direction of the groove-shaped valve seat.

4. The fluid handling device according to claim 1, wherein:
the flat plate-shaped flexible layer includes a plurality of layers, and
one of the plurality of layers which is to come into contact with the inner wall of the groove-shaped valve seat is an elastomeric layer containing an elastomer.

5. A fluid handling system, comprising:
the fluid handling device according to claim 1; and
a valve sliding member capable of pressing the flat plate-shaped flexible layer of the valve.

6. The fluid handling system according to claim 5, wherein
the valve sliding member is a rotary member capable of rotating.

7. A fluid handling system, comprising:
a fluid handling device according to claim 1;
a valve sliding member capable of pressing the flat plate-shaped flexible layer of the valve; and
a pump sliding member capable of pressing the flat plate-shaped flexible layer of the pump.

* * * * *